No. 841,193. PATENTED JAN. 15, 1907.
J. R. SPEER & G. H. HARVEY.
METHOD OF DRAWING GLASS.
APPLICATION FILED NOV. 23, 1906.
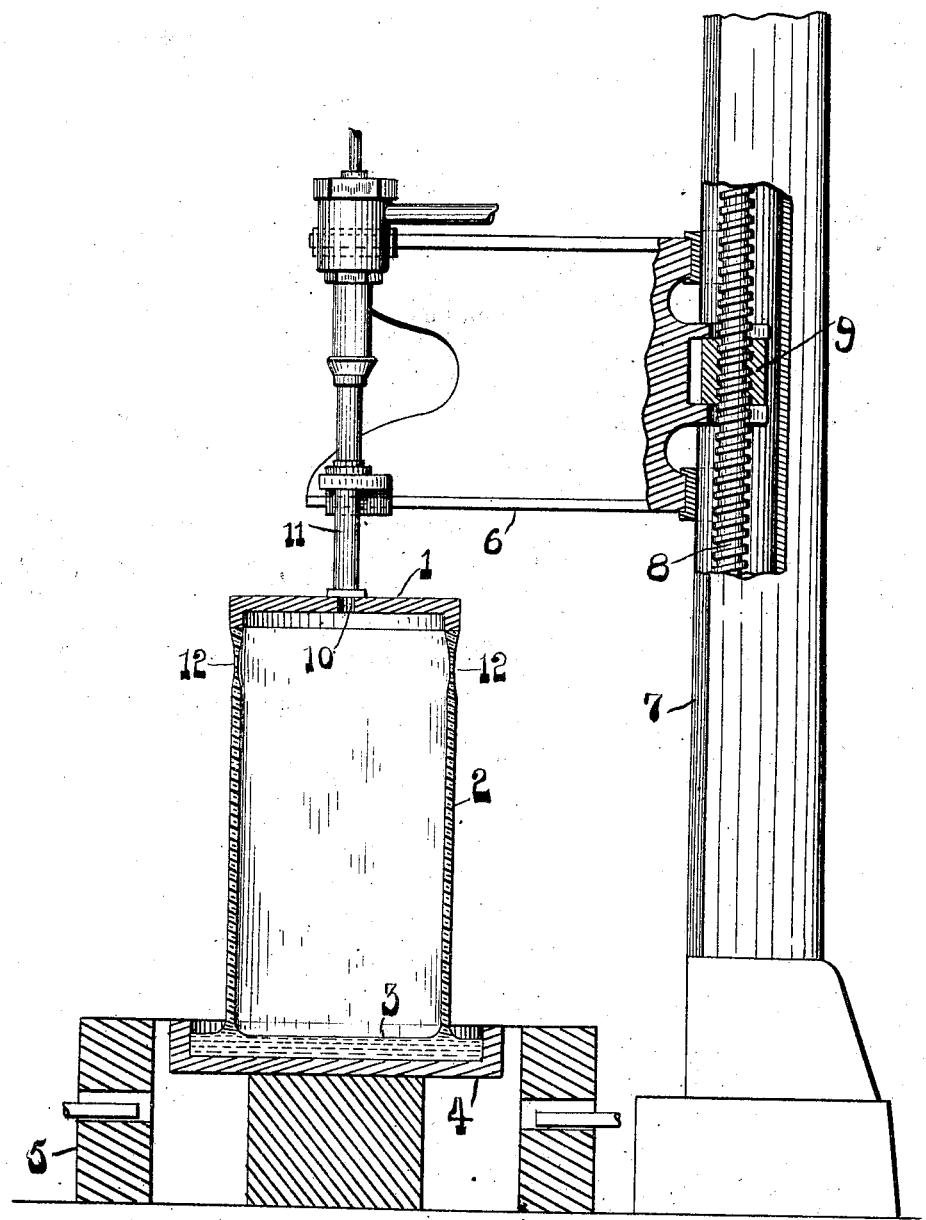
Witnesses:
Inventors,
James R. Speer and George H. Harvey
by their Attorney
F. N. Barber

UNITED STATES PATENT OFFICE.

JAMES RAMSEY SPEER, OF PITTSBURG, AND GEORGE H. HARVEY, OF GLENFIELD, PENNSYLVANIA, ASSIGNORS TO BROWNSVILLE GLASS COMPANY, OF PITTSBURG, PENNSYLVANIA, A CORPORATION OF PENNSYLVANIA.

METHOD OF DRAWING GLASS.

No. 841,193.　　　Specification of Letters Patent.　　　Patented Jan. 15, 1907.

Application filed November 23, 1906. Serial No. 344,708.

*To all whom it may concern:*

Be it known that we, JAMES RAMSEY SPEER, residing at Pittsburg, and GEORGE H. HARVEY, residing at Glenfield, in the county of Allegheny, State of Pennsylvania, citizens of the United States, have invented or discovered new and useful Improvements in Methods of Drawing Glass, of which the following is a specification.

The object of our invention is to draw from a body of molten glass sheets of inclosed or other forms and to initially thin the wall of the sheets as a part of the operation of severing the drawn sheets from the bait or drawing-tool.

In drawing glass sheets from molten glass contained in a receptacle the speed of withdrawal of the film usually determines the thickness of the sheet. If the bait is quickly withdrawn, the glass adhering thereto will be at a temperature approaching that of the glass in the receptacle, and the sheet stretches and draws thin before it has time to set or harden by the action of the surrounding atmosphere or of artificial cooling means. By reducing the speed of withdrawal the sheet is not stretched so readily while cooling more rapidly, thus causing it to draw thicker.

The drawing which accompanies this specification shows in vertical section, partly in elevation, an apparatus by which our improved method may be practiced.

On the drawing, 1 represents a bait by which the glass cylinder 2 is being drawn from the molten bath 3 of glass in the pot 4. 5 is a furnace by which the pot may be suitably heated.

The bait 1 is secured in any desired manner to the carriage 6, which is moved up along the column or standard 7 by means of the feed-screw 8, working in the nut 9, stationary in the carriage. The interior of the cylinder is supplied with air by means of an opening 10 in the top of the bait and a suitable pipe 11, connected to said opening.

The feed-screw may be driven from any suitable source of power, as an electric motor, whose speed may be quickly increased or decreased. The screw might have its speed varied by any of the well-known variable-speed gears. (Not necessary to be illustrated.)

The carriage 6 is lowered by the screw 9 until the depending end of the bait 1 enters the molten glass 3 in the pot 4. The direction of rotation of the screw 9 is then reversed, whereupon the bait rises from the bath, carrying therewith the sheet 2 of glass, substantially conforming to the contour of the depending end of the bait. As the bait is withdrawn the speed of the carriage is initially made faster than required to draw a sheet of desired uniform thickness. The faster speed causes the sheet of glass to stretch and become thinned, as is perfectly obvious. This thinning (shown at 12) will continue for only such a time as will form a line of weakness about the cylinder, so that the cracking off, which will take place along this line, will be much facilitated without injury to the body of the cylinder.

By our method we may dispense with the drawing of the usual necks and shoulders on the cylinders, as we begin the drawing preferably the full size of the cylinder. By thinning the glass as described we can crack off the glass without checking or cracking the body of the cylinder, which is apt to follow if the thinning is omitted.

By the word "initially" used in the description and claim we do not necessarily mean that the glass shall be thinned at the very instant the drawing is commenced, but that the thinning takes place at or about the beginning of the drawing operation, so that the thinned circumferential line shall be close to the drawing-tool.

What we claim is—

The method of drawing sheet-glass, which consists in maintaining a higher temperature in an initial portion of the sheet by a speed of withdrawal above the normal required to draw the remainder of the sheet, whereby said initial portion is drawn thinner than the remaining portion.

Signed at Pittsburg, Pennsylvania, this 12th day of November, 1906.

JAMES RAMSEY SPEER.
　　　　GEORGE H. HARVEY.

Witnesses:
　ELVA STANIEK,
　C. E. EGGERS.